United States Patent
Choffat

(10) Patent No.: US 9,994,744 B2
(45) Date of Patent: Jun. 12, 2018

(54) TIN- AND PHTHALATE-FREE SEALANT BASED ON SILANE TERMINATED POLYMERS

(71) Applicant: SIKA TECHNOLOGY AG, Baar (CH)

(72) Inventor: Fabien Choffat, Rüttenen (CH)

(73) Assignee: SIKA TECHNOLOGY AG, Baar (CH)

(*) Notice: Subject to any disclaimer, the term of this patent is extended or adjusted under 35 U.S.C. 154(b) by 0 days. days.

(21) Appl. No.: 15/315,979

(22) PCT Filed: Jun. 3, 2015

(86) PCT No.: PCT/EP2015/062404
§ 371 (c)(1),
(2) Date: Dec. 2, 2016

(87) PCT Pub. No.: WO2015/185642
PCT Pub. Date: Dec. 10, 2015

(65) Prior Publication Data
US 2017/0101564 A1  Apr. 13, 2017

(30) Foreign Application Priority Data
Jun. 4, 2014 (EP) .................................... 14171163

(51) Int. Cl.
| | |
|---|---|
| *C08K 3/26* | (2006.01) |
| *C09J 175/04* | (2006.01) |
| *C08K 5/101* | (2006.01) |
| *C08G 18/22* | (2006.01) |
| *C08G 18/75* | (2006.01) |
| *C08G 18/32* | (2006.01) |
| *C08G 18/48* | (2006.01) |
| *C08G 18/34* | (2006.01) |
| *C08G 18/66* | (2006.01) |
| *C08G 18/28* | (2006.01) |
| *C09K 3/10* | (2006.01) |

(52) U.S. Cl.
CPC .......... *C09J 175/04* (2013.01); *C08G 18/227* (2013.01); *C08G 18/289* (2013.01); *C08G 18/3203* (2013.01); *C08G 18/343* (2013.01); *C08G 18/4854* (2013.01); *C08G 18/6692* (2013.01); *C08G 18/755* (2013.01); *C08K 3/26* (2013.01); *C08K 5/101* (2013.01); *C09K 3/1018* (2013.01); *C09K 3/1021* (2013.01); *C08G 2190/00* (2013.01); *C08K 2003/265* (2013.01)

(58) Field of Classification Search
None
See application file for complete search history.

(56) References Cited

U.S. PATENT DOCUMENTS

| | | | |
|---|---|---|---|
| 3,971,751 A | 7/1976 | Isayama et al. | |
| 6,207,766 B1 | 3/2001 | Doi et al. | |
| 2007/0100111 A1* | 5/2007 | Stanjek .................. | C08G 18/12 528/44 |
| 2009/0186993 A1* | 7/2009 | Noro ..................... | C08G 65/336 525/474 |
| 2010/0143712 A1* | 6/2010 | Plantenberg ....... | C08G 18/4825 428/355 CN |
| 2011/0232825 A1* | 9/2011 | MacK ................... | C08G 18/10 156/71 |
| 2013/0065997 A1* | 3/2013 | Gahlmann ............. | C09J 171/02 524/262 |
| 2013/0096252 A1* | 4/2013 | Vyakaranam .......... | C08G 18/18 524/588 |
| 2013/0274410 A1* | 10/2013 | Miyafuji .............. | C09D 201/10 524/588 |
| 2015/0083324 A1* | 3/2015 | Stanjek ................ | C08G 65/336 156/305 |
| 2015/0141585 A1 | 5/2015 | Choffat et al. | |
| 2015/0166859 A1* | 6/2015 | Choffat .................. | C09J 175/04 524/315 |

FOREIGN PATENT DOCUMENTS

| | | |
|---|---|---|
| WO | 0248228 A2 | 6/2002 |
| WO | 2013174940 A2 | 11/2013 |

OTHER PUBLICATIONS

Technical data sheet for Sikaflex AT-Connection, 2006, 4 pages.*
International Search Report corresponding to PCT/EP2015/062404, dated Jun. 22, 2015, 4 pages.
International Preliminary Report on Patentability dated Dec. 6, 2016 corresponding to International Patent Application No. PCT/EP2015/0642404, 8 pages.

* cited by examiner

Primary Examiner — Robert S Loewe
(74) Attorney, Agent, or Firm — Dentons US LLP

(57) ABSTRACT

The present invention provides a moisture-curing sealant comprising a) at least one silane-functional polymer and b) at least one catalyst for the crosslinking of the silane-functional polymer, said sealant being free of organotin compounds and having, in the cured state, a secant modulus at 100% elongation and 23° C., determined to ISO 8339, of less than 0.4 MPa and a resilience at 100% elongation, determined to ISO 7389, of greater than 70%. The sealant is especially suitable as a construction sealant of the 25LM class according to DIN EN ISO 11600, especially as a facade sealant, or as a sealant according to ASTM C719 Class 50.

20 Claims, No Drawings

TIN- AND PHTHALATE-FREE SEALANT BASED ON SILANE TERMINATED POLYMERS

CROSS-REFERENCE TO PRIOR APPLICATIONS

This application is a National Stage of PCT/EP2015/062404, filed Jun. 3, 2015, and designating the United States (published on Dec. 10, 2015, as WO 2015/185642 A1), which claims priority under 35 U.S.C. § 119 to European Patent Application No. 14171163.0, filed Jun. 4, 2014, each hereby expressly incorporated by reference in its entirety and each assigned to the assignee hereof.

TECHNICAL FIELD

The invention relates to tin-free and phthalate-free, moisture-curing sealants based on silane-functional polymers.

PRIOR ART

Moisture-curing sealants based on silane-functional polymers (STP) are known and are used in large quantities as elastic sealants in construction, for example. Such sealants contain different components depending on the field of use and on the requirements imposed on them, at application and after curing.

The standard DIN EN ISO 11600 classifies joint sealants in different classes depending on the respective requirements. Classified in class 25LM are sealants which have a low modulus and high elastic recovery and which represent particularly high-grade sealants, being suitable as construction sealants, more particularly as exterior facing sealants.

Sealants based on silane-functional polymers which meet the requirements of class 25LM according to DIN EN ISO 11600 are known. Generally, however, the STP products on the market include organotin compounds as catalysts and/or phthalate-containing plasticizers. Generally speaking, moreover, they eliminate methanol in the course of curing.

Also known are sealants based on silane-functional polymers which meet the requirements of the ASTM C719 standard's class 50. To pass this standard, products have hitherto been used that are based on MS prepolymers, which are silane-modified polyols. An example of one such product is Sonolastic®150 VLM from BASF. These products have an almost plastic behavior, meaning that the joint barely returns to the original form once extension has taken place. With the products available on the market and based on MS prepolymers, therefore, it is possible to meet the requirements according to ASTM C719 class 50, but not in combination with effective elastic recovery.

Organotin compounds are a health concern. Furthermore, organotin compounds are heat-sensitive. Phthalate-containing plasticizers as well are considered to be a health hazard and, on the basis of official regulations, are being banned from increasing numbers of products. The release of methanol is a problem, since methanol and especially its metabolites are toxic to humans and in high doses can lead to damage to health.

Particularly strict regulations governing the usage of chemicals are encountered in the Scandinavian countries. There, organotin compounds and phthalate-containing plasticizers are classed as groups of substances to be avoided. There is a likelihood that the trend toward regulations which prohibit entirely or limit the use of substances seen to be a health concern will intensify further in other countries as well.

From the standpoints of ecology and health, further, a need exists to find new possibilities for use for renewable raw materials.

SUMMARY OF THE INVENTION

It is an object of the present invention, therefore, to provide a moisture-curing sealant, based on silane-functional polymers, which manages without substances of health concern and at the same time in the cured state is relatively elastic and exhibits high elastic recovery, without substantial detriment to the applications properties. It is to be suitable as a construction sealant and more particularly as an exterior facing sealant.

The intention in particular was to provide a high-grade sealant which is unobjectionable in terms of health while at the same time meeting the exacting requirements of sealants of class 25LM according to ISO 11600 without detriment to the other applications properties, such as adhesion, for example. Moreover, it ought to be possible to use components based on renewable raw materials, and for emission burdens to be low. The sealant is also to possess high thermal stability and storage stability.

According to one embodiment, the sealants ought also to meet the requirements according to standard ASTM C719 class 50.

Surprisingly it has now been found that sealants as defined in claim 1 achieve this object.

The sealants of the invention are largely free from substances of concern to health, possess good applications properties, and can be employed as high-end construction sealants. In a cured state they exhibit high elasticity and can be formulated as sealants with a low emission burden.

Surprisingly, it was also advantageous to use a relatively high proportion of substances based on renewable raw materials as plasticizers in these sealants, substantially retaining the favorable properties.

The invention also relates to the use of the sealants as construction sealants and to the products obtainable from the sealants after moisture curing.

Particularly preferred embodiments of the invention are subjects of the dependent claims.

CERTAIN EMBODIMENTS OF THE INVENTION

The invention relates to a moisture-curing sealant comprising
a) at least one silane-functional polymer P and
b) at least one catalyst for the crosslinking of the silane-functional polymer P,
the sealant being free from organotin compounds and having in the cured state, i.e., after curing for 7 days at 23° C. and 50% relative humidity, a secant modulus at 100% extension and 23° C., determined to DIN EN ISO 8339, of less than 0.4 MPa and an elastic recovery at 100% elongation, determined to DIN EN ISO 7389, of greater than 70%.

The secant modulus is determined at 100% elongation and 23° C. in accordance with DIN EN ISO 8339. In the cured state, the sealant of the invention has a secant modulus at 100% extension and 23° C. according to DIN EN ISO 8339 of less than 0.4 MPa.

The elastic recovery is determined at 100% elongation in accordance with ISO 7389 (DIN concrete slabs, curing: 28 days at 23° C. and 50% relative humidity). In the cured state, the sealant of the invention has an elastic recovery at 100% extension, determined to ISO 7389, of greater than 70%.

The sealant of the invention preferably has an extrusion force of less than 800 N. The extrusion force is a measurement of the flow quality. The method for determining the extrusion force is described below in the experimental section.

The sealant is preferably a construction sealant of class 25LM according to ISO 11600, meaning that it meets the requirements contained in that standard for class 25LM therein.

In one preferred embodiment, the sealant is also a sealant which meets the requirements according to ASTM C719 class 50.

Substance names beginning with "poly", such as polyol or polyisocyanate, refer here to substances which formally contain per molecule two or more of the functional groups appearing in their name.

The term "silane" or "organosilane" refers to compounds which on the one hand have at least one, customarily two or three, hydrolysable groups, preferably alkoxy groups or acyloxy groups, bonded directly to the silicon atom via Si—O bonds, and on the other hand have at least one organic radical bonded directly to the silicon atom via an Si—C bond. Silanes having alkoxy groups or acyloxy groups are also known to the person skilled in the art as organoalkoxy silanes and organoacyloxy silanes, respectively.

Correspondingly, the term "silane group" identifies the silicon-containing group bonded to the organic radical of the silane, which is bonded by the Si—C bond to a compound. The silanes and their silane groups have the property of undergoing hydrolysis in the event of contact with moisture. This produces organosilanols, i.e., silicon-organic compounds containing one or more silanol groups (Si—OH groups) and, through subsequent condensation reactions, organosiloxanes, in other words silicon-organic compounds containing one or more siloxane groups (Si—O—Si groups).

The term "silane-functional" identifies compounds which have silane groups. "Silane-functional polymers", accordingly, are polymers, more particularly organic polymers, which have at least one, preferably two or more, e.g., two, silane groups. The silane groups may take the form of side groups or, preferably end groups. Silane-functional polymers are also referred to as silane-terminated polymers (STP). γ-silane-functional polymers are polymers in which the Si atom of the silane group is linked to the polymer via a 1,3-propylene bridge.

The sealants comprising the silane-functional polymer are moisture-curing, meaning that in the presence of water or moisture, more particularly atmospheric moisture the above-described hydrolysis and condensation reactions on the silane groups take place, causing crosslinking of the polymer molecules and curing of the sealant. The curing is also referred to as crosslinking.

"Aminosilanes", "isocyanatosilanes", and "mercaptosilanes" are organosilanes whose organic radical has at least one amino group, at least one isocyanate group, and at least one mercapto group, respectively. "Primary aminosilanes" are aminosilanes which have a primary amino group, i.e., an $NH_2$ group which is bonded to an organic radical. "Secondary aminosilanes" are aminosilanes which have a secondary amino group, i.e., an NH group which is bonded to two organic radicals.

"Room temperature" refers here to a temperature of 23° C.

"Molecular weight" of oligomers or polymers is understood in the present document to be the molecular weight average $M_n$ (number average), which is typically determined by means of GPC against polystyrene as standard.

The sealant of the invention comprises at least one silane-functional polymer P which in particular has end groups of the formula (I),

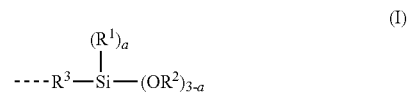

(I)

in which the radical $R^1$ is a linear or branched, monovalent hydrocarbon radical having 1 to 8 C atoms, more particularly a methyl or ethyl group, the radical $R^2$ is an acyl radical or a linear or branched, monovalent hydrocarbon radical having 1 to 5 C atoms, more particularly a methyl, ethyl or isopropyl group, preferably an ethyl or isopropyl group, the index a is 0 or 1 or 2, more particularly 0, and the radical $R^3$ is a linear or branched, divalent hydrocarbon radical having 1 to 12 C atoms, which optionally has cyclic fractions and optionally one or more heteroatoms, more particularly one or more nitrogen atoms, and more particularly is an alkylene group having 1 to 6 C atoms, preferably 2 to 6 C atoms, more particularly a propylene group.

Within a silane group of the formula (I), $R^1$ and $R^2$ each independently of one another stand for the radicals described. Also possible, therefore, for example, are compounds having end groups of the formula (I) which are ethoxydimethoxysilane end groups ($R^2$=methyl, $R^2$=methyl, $R^2$=ethyl).

In one preferred embodiment the silane-functional polymer P is a γ-silane-terminated polymer. In this case the radical $R^3$ is preferably propylene.

In one preferred embodiment the silane-functional polymer P eliminates no methanol on curing. In this embodiment the silane-functional polymer P contains no methoxy groups bonded to silicon. Preferably this is a silane-functional polymer P which has end groups of the formula (I) as defined above in which $R^2$ is not a methyl group. In this case the silane-functional polymer P preferably has ethoxy groups bonded to silicon, and more particularly it is a silane-functional polymer P which has end groups of the formula (I) as defined above in which $R^2$ is an ethyl group. In this case, environmentally and toxicologically harmless ethanol is released in the course of the curing of the composition.

In a further preferred embodiment, the sealant comprises no constituents which eliminate methanol in the course of curing.

Besides the silane-functional polymer P, there may possibly be elimination of methanol in the course of curing by other reactive constituents optionally present, such as adhesion promoters, drying agents, reactive diluents or crosslinkers, for example, which are described below. These constituents as well are typically silane-functional compounds containing alkoxy groups. It is therefore preferred for the sealant to contain no silane-functional compounds which contain methoxy silane groups.

Examples of suitable silane-functional polymers P are silane-functional polyurethane polymers, including polyether-polyurethanes and polyester-polyurethanes, polyurea polymers, including polyether-polyureas and polyester-polyureas, polyisocyanurates, polycarbodiimides, poly(meth)acrylate polymers, and polyether polymers, such as polyoxyalkylene polymers.

In one preferred embodiment the silane-functional polymer P is a silane-functional polyurethane polymer P1 which is obtainable by the reaction of a silane having at least one group that is reactive toward isocyanate groups with a polyurethane polymer which contains isocyanate groups. This reaction is carried out preferably in a stochiometric ratio of the groups that are reactive toward isocyanate groups to the isocyanate groups of 1:1, or with a slight excess of groups that are reactive toward isocyanate groups, and so the resulting silane-functional polyurethane polymer P1 is entirely free from isocyanate groups.

In the reaction of the silane containing at least one group that is reactive toward isocyanate groups with a polyurethane polymer which contains isocyanate groups, the silane may in principle, albeit not preferably, be used in substochiometric quantities, to give a silane-functional polymer which contains both silane groups and isocyanate groups.

The silane which contains at least one group that is reactive toward isocyanate groups is, for example, a mercaptosilane or an aminosilane, more particularly an aminosilane.

The aminosilane is preferably an aminosilane AS of the formula (II),

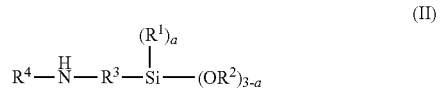

(II)

where $R^1$, $R^2$, $R^3$, and a are as defined above for the silane group of the formula (I), including the preferred embodiments, and $R^4$ is a hydrogen atom or a cyclic, linear or branched, monovalent hydrocarbon radical having 1 to 20 C atoms, which optionally has cyclic fractions, or is a radical of the formula (III)

(III)

in which the radicals $R^5$ and $R^6$ in each case independently of one another are a hydrogen atom or a radical from the group consisting of $-R^8$, $-COOR^8$, and $-CN$, the radical $R^7$ is a hydrogen atom or a radical from the group consisting of $-CH_2-COOR^8$, $-COOR^8$, $-CONHR^8$, $-CON(R^8)_2$, $-CN$, $-NO_2$, $-PO(OR^8)_2$, $-SO_2R^8$, and $-SO_2OR^8$, and the radical $R^8$ is a hydrocarbon radical having 1 to 20 C atoms which optionally contains at least one heteroatom.

Examples of suitable aminosilanes AS are primary aminosilanes such as 3-aminopropyltrimethoxysilane, 3-aminopropyldimethoxymethylsilane; secondary aminosilanes such as N-butyl-3-aminopropyltrimethoxysilane, N-phenyl-3-aminopropyltrimethoxysilane; the products of the Michael-like addition of primary aminosilanes such as 3-aminopropyltrimethoxysilane or 3-aminopropyldimethoxymethylsilane with Michael acceptors such as acrylonitrile, (meth)acrylic esters, (meth)acrylamides, maleic diesters and fumaric diesters, citraconic diesters and itaconic diesters, e.g., dimethyl and diethyl N-(3-trimethoxysilylpropyl)aminosuccinate; and also analogs of the stated aminosilanes having ethoxy or isopropoxy groups instead of the methoxy groups on the silicon, preferably having ethoxy groups.

Particularly suitable aminosilanes AS are secondary aminosilanes, especially aminosilanes AS in which $R^4$ in formula (II) is other than H. Preference is given to the Michael-like adducts, more particularly diethyl N-(3-trimethoxysilylpropyl)aminosuccinate, diethyl N-(3-triethoxysilylpropyl)aminosuccinate, and diethyl N-(3-triisopropoxysilylpropyl)aminosuccinate.

Michael acceptors are compounds which contain double bonds activated by electron acceptor radicals and which are therefore able to enter with primary amino groups (NH2 groups) into nucleophilic addition reactions in a manner analogous to Michael addition (hetero-Michael addition).

Examples of suitable polyurethane polymer containing isocyanate groups for producing a silane-functional polyurethane polymer P1 are polymers obtainable by the reaction of at least one polyol with at least one polyisocyanate, more particularly a diisocyanate. This reaction may be accomplished by bringing the polyol and the polyisocyanate to reaction with customary methods, as for example from temperatures of 50° C. to 100° C., optionally with accompanying use of suitable catalysts, the polyisocyanate being metered such that these isocyanate groups are in a stochiometric excess in relation to the hydroxyl groups of the polyol.

The excess of polyisocyanate is selected in particular such that the amount of free isocyanate groups present in the resulting polyurethane polymer after the reaction of all of the hydroxyl groups of the polyol is from 0.1 to 5 wt %, preferably 0.1 to 2.5 wt %, more preferably 0.2 to 1 wt %, based on the overall polymer.

Preferred polyurethane polymers are those having the stated amount of free isocyanate groups and obtained from the reaction of diisocyanates with high molecular mass diols in an NCO:OH ratio of 1.5:1 to 2.2:1.

Suitable polyols for preparing the polyurethane polymer are, in particular, polyether polyols, polyester polyols, and polycarbonate polyols, and also mixtures of these polyols. Particularly suitable are polyoxyethylene polyols and polyoxypropylene polyols, more particularly polyoxyethylene diols, polyoxypropylene diols, polyoxyethylene triols, and polyoxypropylene triols.

Especially suitable are polyoxyalkylene diols or polyoxyalkylene triols having a degree of unsaturation of less than 0.02 meq/g and having an average molecular weight in the range from 1000 to 30 000 g/mol, and also polyoxyethylene diols, polyoxyethylene triols, polyoxypropylene diols, and polyoxypropylene triols having an average molecular weight of 400 to 20 000 g/mol. Likewise particularly suitable are so-called ethylene oxide-terminated ("EO-endcapped", ethylene oxide-endcapped) polyoxypropylene polyols.

Additionally suitable are polybutadiene polyols terminated with hydroxyl groups, examples being those polyols which are prepared by polymerization of 1,3-butadiene and allyl alcohol or by oxidation of polybutadiene, and also their hydrogenation products.

Additionally suitable are styrene-acrylonitrile-grafted polyether polyols, as available commercially for example under the trade name Lupranol® from Elastogran GmbH, Germany.

Particularly suitable polyester polyols are polyesters which carry at least two hydroxyl groups and are prepared by known methods, in particular by polycondensation of hydroxycarboxylic acids or polycondensation of aliphatic and/or aromatic polycarboxylic acids with dihydric or polyhydric alcohols.

Especially suitable polycarbonate polyols are those as obtainable by reaction, for example, of the abovementioned alcohols—those used to synthesize the polyester polyols—with dialkyl carbonates such as dimethyl carbonate, diaryl carbonates such as diphenyl carbonate or phosgene. Particularly suitable are polycarbonate diols, especially amorphous polycarbonate diols.

Further suitable polyols are poly(meth)acrylate polyols.

Suitability is further possessed by polyhydroxy-functional fats and oils, examples being natural fats and oils, more particularly castor oil, or so-called oleochemical polyols, obtained by chemical modification of natural fats and oils, and the epoxy polyesters or epoxy polyethers obtained for example by epoxidation of unsaturated oils and subsequent ring opening with carboxylic acids or alcohols, respectively, or polyols obtained by hydroformylation and hydrogenation of unsaturated oils.

Suitability is further possessed by polyols which are obtained from natural fats and oils by degradation procedures such as alcoholysis or ozonolysis and subsequent chemical linkage, by transesterification or dimerization, for example, of the resultant degradation products or derivatives thereof. Suitable degradation products of natural fats and oils are, in particular, fatty acids and fatty alcohols and also fatty acid esters, in particular the methyl esters (FAME), which may be derivatized, for example by hydroformylation and hydrogenation to form hydroxy-fatty acid esters.

Likewise suitable, furthermore, are polyhydrocarbon polyols, also called oligohydrocarbonols, examples being polyhydroxy-functional ethylene-propylene, ethylene-butylene or ethylene-propylene-diene copolymers, as produced for example by Kraton Polymers, USA, or polyhydroxy-functional copolymers of dienes such as 1,3-butanediene or diene mixtures and vinyl monomers such as styrene, acrylonitrile or isobutylene, or polyhydroxy-functional polybutadiene polyols, examples being those which are prepared by copolymerization of 1,3-butadiene and allyl alcohol and may also have been hydrogenated.

Additionally suitable are polyhydroxy-functional acrylonitrile/butadiene copolymers, of the kind that can be prepared for example from epoxides or amino alcohols and carboxyl-terminated acrylonitrile/butadiene copolymers which are available commercially under the name Hypro® CTBN from Emerald Performance Materials, LLC, USA.

These stated polyols preferably have an average molecular weight of 250 to 30 000 g/mol, more particularly of 1000 to 30 000 g/mol, and an average OH functionality in the range from 1.6 to 3.

Particularly suitable polyols are polyester polyols and polyether polyols, more particularly polyoxyethylene polyol, polyoxypropylene polyol, and polyoxypropylene-polyoxyethylene polyol, preferably polyoxyethylene diol, polyoxypropylene diol, polyoxyethylene triol, polyoxypropylene triol, polyoxypropylene-polyoxyethylene diol and polyoxypropylene-polyoxyethylene triol.

Further to these stated polyols it is possible to use small amounts of low molecular mass dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular mass alkoxylation products of the aforementioned dihydric and polyhydric alcohols, and mixtures of the aforementioned alcohols, when preparing the polyurethane polymer containing terminal isocyanate groups.

Polyisocyanates which can be used for preparing the polyurethane polymer are commercial polyisocyanates, especially diisocyanates.

Suitable diisocyanates for example are 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl) naphthalene, 2,4- and 2,6-tolylene diisocyanate (TDI), 4,4'-, 2,4'-, and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), oligomers and polymers of the aforesaid isocyanates, and also any desired mixtures of the aforesaid isocyanates.

Suitable silane-functional polymers P1 are, for example, those available commercially under the trade names Polymer ST, as for example Polymer ST50, from Hanse Chemie AG, Germany, and also under the trade name Desmoseal® from Bayer MaterialScience AG, Germany.

In a second preferred embodiment, the silane-functional polymer P is in the form of a silane-functional polyurethane polymer P2, obtainable by the reaction of an isocyanatosilane IS with a polymer which has functional end groups that are reactive toward isocyanate groups, more particularly hydroxyl groups, mercapto groups and/or amino groups. This reaction takes place in a stochiometric ratio of the isocyanate groups to the functional end groups that are reactive toward isocyanate groups of 1:1, or with a slight excess of the functional end groups that are reactive toward isocyanate groups, as for example at temperatures of 20° C. to 100° C., optionally with accompanying use of catalysts.

Suitability as isocyanatosilane IS is possessed by compounds of the formula (IV),

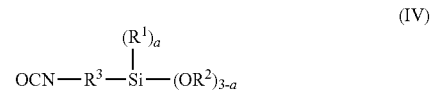

(IV)

where $R^1$, $R^2$, $R^3$, and a are as defined above for the silane group of the formula (I), including the preferred embodiments.

Examples of suitable isocyanatosilanes IS of the formula (IV) are isocyanato-methyltrimethoxysilane, isocyanatomethyldimethoxymethylsilane, 3-isocyanatopropyltrimethoxysilane, 3-isocyanatopropyldimethoxymethylsilane, and their analogs having ethoxy or isopropoxy groups instead of the methoxy groups on the silicon, more particularly having ethoxy groups.

As functional end groups that are reactive toward isocyanate groups, the polymer preferably contains hydroxyl groups. Polymers containing hydroxyl groups are suitably, on the one hand, high molecular mass polyoxyalkylene polyols already stated, preferably polyoxypropylene diols having a degree of unsaturation of less than 0.02 meq/g and having an average molecular weight in the range from 4000 to 30 000 g/mol, especially those having an average molecular weight in the range from 8000 to 30 000 g/mol.

Also suitable on the other hand for reaction with isocyanatosilanes IS of the formula (IV) are polyurethane polymers containing hydroxyl groups, more particularly polyurethane polymers terminated with hydroxyl groups. Polyurethane polymers of this kind are obtainable through the reaction of at least one polyisocyanate with at least one polyol. This reaction may be accomplished by reacting the polyol and the polyisocyanate by customary methods, as for example at temperatures of 50° C. to 100° C., optionally with accompanying use of suitable catalysts, the polyol being metered such that its hydroxyl groups are in a stochiometric excess in relation to the isocyanate groups of the polyisocyanate. A preferred ratio of hydroxyl groups to isocyanate groups is from 1.3:1 to 4:1, more particularly from 1.8:1 to 3:1.

Polyols and polyisocyanates suitable for this reaction are the same as those already mentioned as being suitable for the preparation of a polyurethane polymer containing isocyanate groups that is used for the preparation of a silane-functional polyurethane polymer P1.

Suitable silane-functional polymers P2 for example are those available commercially under the trade names SPUR+ 1010LM, 1015LM, and 1050MM from Momentive Performance Materials Inc., USA, and also under the trade names Geniosil[ STP-E15, STP-10, and STP-E35 from Wacker Chemie AG, Germany.

In a third preferred embodiment, the silane-functional polymer P is a silane-functional polymer P3 which is obtainable by a hydrosilylation reaction of polymers having terminal double bonds, examples being poly(meth)acrylate polymers or polyether polymers, more particularly of allyl-terminated polyoxyalkylene polymers, described for example in U.S. Pat. No. 3,971,751 and U.S. Pat. No. 6,207,766, the entire disclosure content of which is hereby included.

Suitable silane-functional polymers P3 for example are those available commercially under the trade names MS Polymer™ 5203H, 5303H, S227, S810, MA903, and S943, Silyl™ SAX220, SAX350, SAX400, and SAX725, Silyl™ SAT350, and SAT400, and also XMAP™ SA100S and SA310S from Kaneka Corp., Japan, and also under the trade names Excestar® S2410, S2420, S3430, S3630, W2450, and MSX931 from Asahi Glass Co, Ltd., Japan.

The proportion of the silane-functional polymer P in the sealant may vary within wide ranges. Customarily the silane-functional polymer P is present in the sealant in a proportion for example of 5 to 80 wt %, preferably of 10 to 60 wt %, more preferably of 15 to 50 wt %.

The sealant of the invention further comprises at least one catalyst for the crosslinking of the silane-functional polymer P. Use may be made of the customary catalysts known for this purpose to the person skilled in the art. The catalyst is preferably a metal catalyst and/or a nitrogen-containing compound.

The sealant of the invention is substantially free from organotin compounds. More particularly the tin content of the composition is less than 0.06 wt %, more particularly less than 0.01 wt %. The sealant of the invention is preferably entirely free from organotin compounds and/or completely tin-free, meaning that the sealant contains no tin compounds and also no tin in elemental or ionic form.

Suitable metal catalysts are, for example, organotitanates, organozirconates, and organoaluminates. The organotitanates, organozirconates, and organoaluminates preferably contain ligands selected from an alkoxy group, sulfonate group, carboxylate group, dialkyl phosphate group, dialkyl pyrophosphate group, and acetylacetonate group, it being possible for all the ligands to be identical or different from one another. In the formulae shown below, the dashed line represents the bond of the oxygen to the metal.

Examples of suitable alkoxy groups are isobutoxy, n-butoxy, isopropoxy, ethoxy, and 2-ethylhexoxy. Also having proven particularly suitable as alkoxy groups are so-called neoalkoxy substituents, particularly of the formula (V).

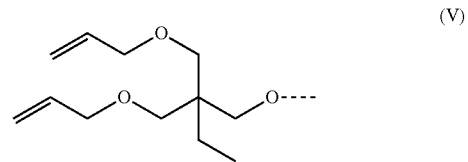

(V)

Having proven suitable as sulfonate groups are, in particular, aromatic sulfonates whose aromatic moieties are substituted by an alkyl group. Radicals of the formula (VI) are considered to be preferred sulfonic acids.

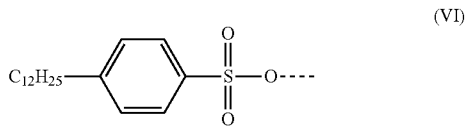

(VI)

Having proven particularly suitable as carboxylate groups are, for example, carboxylates of fatty acids. Decanoate, stearate, and isostearate are considered to constitute preferred carboxylate.

The organotitanates, organozirconates, and organoaluminates have ligands which include with particular preference at least one multidentate ligand, also called chelate ligand. The multidentate ligand is preferably a bidentate ligand.

The bidentate ligand is preferably a ligand of the formula (VII)

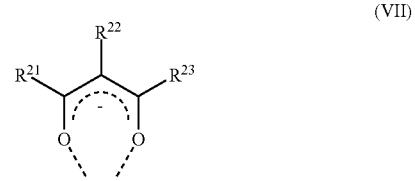

(VII)

in which the radical $R^{21}$ is a hydrogen atom or a linear or branched alkyl group having 1 to 8 C atoms, more particularly a methyl group, the radical $R^{22}$ is a hydrogen atom or a linear or branched alkyl group having from 1 to 8 C atoms which optionally contains heteroatoms, and more particularly is a hydrogen atom, and the radical $R^{23}$ is a hydrogen atom or an alkyl group having 1 to 8, more particularly having 1 to 3, C atoms, or is a linear or branched alkoxy group having 1 to 8, more particularly having 1 to 3 C atoms.

One preferred catalyst is an organotitanate, more particularly an organotitanate of the formula (VIII)

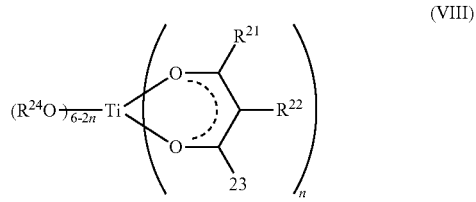

(VIII)

in which the radicals $R^{21}$, $R^{22}$, and $R^{23}$ are as defined above in the formula (VII), the radical $R^{24}$ is a linear or branched alkyl radical having 2 to 20 C atoms, more particularly an isobutyl or isopropyl radical, and n is 1 or 2, more particularly 2.

Preferred organotitanates are those of the formula (VIII) where $R^{21}$ is a methyl group, $R^{22}$ is a hydrogen atom, $R^{23}$ is a methyl group or methoxy or ethoxy group, and $R^{24}$ is an isobutyl or an isopropyl radical.

Further suitable organotitanates are titanium(IV) complex compounds having one or more amino alkoxide ligands, especially triethanolamine or 2-((2-aminoethyl)amino)ethanol, and one or more alkoxide ligands, titanium(IV) complex compounds having four alkoxide ligands, and also more highly condensed organotitanates, especially oligomeric titanium(IV) tetrabutoxide, also called polybutyl titanate.

Specific examples are bis(ethylacetoacetato)diisobutoxytitanium(IV), bis(ethylacetoacetato)diisopropoxytitanium(IV), bis(acetylacetonato)-diiso-propoxytitanium(IV), bis(acetylacetonato)diisobutoxytitanium(IV), tris(oxyethyl)-aminoisopropoxytitanium(IV), bis[tris(oxyethyl)amino]diisopropoxytitanium(IV), bis(2-ethylhexane-1,3-dioxy)titanium(IV), tris[2-((2-aminoethyl)amino)ethoxy]-ethoxytitanium(IV), bis(neopentyl(diallyl)oxy)diethoxytitanium(IV), titanium(IV) tetrabutoxide, tetra-(2-ethyl hexyloxy)titanate, tetra(isopropoxy)titanate, and polybutyl titanate.

An advantage of organotitanates is that a higher rate can be achieved in crosslinking.

Suitable organotitanates are available commercially for example under the trade names Tyzor® AA, GBA, GBO, AA-75, AA-65, AA-105, DC, BEAT, BTP, TE, TnBT, KTM, TOT, TPT or IBAY from DuPont, USA, or under the trade names Tytan™ 15 PBT, TET, X85, TAA, ET, S2, S4 or S6 available commercially from TensoChema AG, Switzerland, and Ken-React® KR TTS, 7, 9QS, 12, 26S, 33DS, 38S, 39DS, 44, 134S, 138S, 133DS, 158FS or LICA® 44 from Kenrich Petrochemicals.

Organozirconates are available commercially, from Kenrich Petrochemicals, for example. Examples of suitable organozirconates are Ken React® NZ 38J, NZ TPPJ, KZ OPPR, KZ TPP, NZ 01, NZ 09, NZ 12, NZ38, NZ 44, NZ 97. Other suitable organozirconates are available commercially under the trade names Snapcure™ 3020, 3030, 1020 from Johnson Matthey & Brandenberger AG, Switzerland.

Suitable organoaluminates are available commercially for example under the trade name K-Kat® 5218 from Worlée-Chemie GmbH, Germany.

Nitrogen-containing compounds that are suitable catalysts are, for example, amines such as, in particular, N-ethyldiisopropylamine, N,N,N',N'-tetramethylalkylenediamines, polyoxyalkylenamines, 1,4-diazabicyclo[2.2.2]octane, aminosilanes such as 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)propyl]ethylenediamine, and also their analogs having ethoxy or isopropoxy instead of the methoxy groups on the silicon.

With particular preference the sealant of the invention comprises at least one nitrogen-containing compound as catalyst which has at least one amidino group. More particularly this is a compound of the formula (IX)

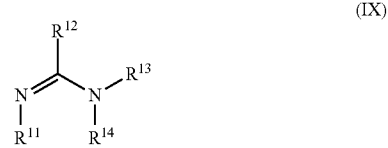

(IX)

in which the radical $R^{11}$ is a hydrogen atom, a monovalent hydrocarbon radical having 1 to 10 C atoms, or, together with $R^{14}$, is an optionally substituted, divalent hydrocarbon radical having 1 to 10 C atoms, the radical $R^{12}$ is a hydrogen atom, a monovalent hydrocarbon having 1 to 12 C atoms, optionally with cyclic or aromatic fractions, and optionally with one or more heteroatoms, an amino group or, together with $R^{13}$, is an optionally substituted, divalent hydrocarbon radical having 1 to 10 C atoms, the radical $R^{13}$ is a hydrogen atom, a monovalent hydrocarbon radical having 1 to 12 C atoms, optionally with cyclic or aromatic fractions, and optionally with one or more heteroatoms, or together with $R^{12}$ is an optionally substituted, divalent hydrocarbon radical having 1 to 10 C atoms, and the radical $R^{14}$ is a hydrogen atom, a monovalent hydrocarbon radical having 1 to 10 C atoms or, together with $R^{11}$ is an optionally substituted, divalent hydrocarbon radical having 1 to 10 C atoms.

The radical $R^{12}$ and/or $R^{13}$ which contains heteroatoms is for example an alkyl radical which contains a silane group, such as an alkyltrialkoxysilane radical, for instance, the silane group preferably having no methoxy groups.

The compound which has at least one amidino group is preferably a guanidine, an imidazole, an imidazoline, an amidine, preferably a bicyclic amidine, or a derivative of these compounds. Such derivatives are, for example, substituted imidazoles or imidazolines, more particularly imidazoles or imidazolines having a silane group, the silane group preferably having no methoxy groups.

The amidine is preferably a bicyclic amidine, more particularly having 9, 10, 11, or 12 carbon atoms in the bicyclic constituent. The advantage of these compounds is that they have a relatively high reactivity and their amount can therefore be kept comparatively low. As a result, in turn, the exudation of these compounds from the cured composition can be reduced.

Examples are amidines, such as 1,8-diazabicyclo[5.4.0]undec-7-ene (DBU), 1,5-diazabicyclo[4.3.0]non-5-ene (DBN), 6-dibutylamino-1,8-diazabicyclo-[5.4.0]undec-7-ene; methyltriazabicyclodecene, guanidines such as tetramethylguanidine, 2-guanidinobenzimidazole, acetylacetoneguanidine, 1,3-di-o-tolylguanidine, 1,3-diphenylguanidine, tolylbiguanidine, 2-tert-butyl-1,1,3,3-tetramethylguanidine, and imidazoles such as N-(3-trimethoxysilylpropyl)-4,5-dihydroimidazole and N-(3-triethoxysilylpropyl)-4,5-dihydroimidazole.

Especially suitable are also combinations of different catalysts, more particularly combinations of at least one metal catalyst and at least one nitrogen-containing compound which has at least one amidino group.

Preferred as catalyst are organotitanates, amines, and compounds which have at least one amidino group, such as amidines, more particularly bicyclic amidines, guanidines, and imidazoles, and combinations thereof, further preference being given to amidines, especially bicyclic amidines, and organotitanates. Particularly preferred are amidines, especially bicyclic amidines, and even more preferred is a combination of at least one amidine, more particularly a bicyclic amidine, and at least one organotitanate. This combination is used with particular preference when the silane-functional polymer P has silane groups of the formula (I) of which $R^2$ is an ethyl group.

The proportion of the catalyst in the sealant may vary within wide ranges, but is preferably 0.01 to 5 wt %, more particularly 0.05 to 3 wt %, more preferably 0.1 to 2 wt %, most preferably 0.2 to 1 wt %, of the overall composition.

The sealant of the invention further optionally comprises at least one plasticizer, the use of plasticizers being preferred. Examples of suitable plasticizers are esters of organic carboxylic acids or their anhydrides, such as fatty acid alkyl esters, phthalates, such as dioctyl phthalate, diisononyl phthalate or diisodecyl phthalate, adipates, such as dioctyl adipate, azelates and sebacates, polyols, such as polyoxyalkylene polyols or polyester polyols, organic phosphoric and sulfonic esters, mineral oils or polybutenes.

The sealant, however, is preferably free from phthalate-containing compounds, meaning that the sealant is, in particular, free from phthalate-containing plasticizers, which are typically employed in the sealants according to the prior art.

Preferred plasticizers used are fatty acid alkyl esters, alkylsulfonic esters of phenol, mineral oils, plasticizers based on renewable raw materials, which may likewise be fatty acid alkyl esters, or combinations thereof. In one preferred embodiment the sealant comprises at least 10 wt % of one or more plasticizers based on renewable raw materials, it additionally being possible for the sealant to contain one or more other plasticizers not based on renewable raw materials.

Examples of plasticizers based on renewable raw materials are vegetable oils, such as rapeseed oil, soybean oil, and palm oil, and esters, especially methyl esters, of vegetable oils, such as rapeseed oil methyl ester, soya methyl ester, and palm oil methyl ester.

Examples of plasticizers which are not based on renewable raw materials but are phthalate-free are diisononyl 1,2-cyclohexanedicarboxylate, Solusolv®2075 from Solutia, the Benzoflex® products from Eastman Chemical Company, and alkylsulfonic esters of phenol such as Mesamoll® from Lanxess.

The plasticizer more preferably comprises diisononyl 1,2-cyclohexanedicarboxylate, alkylsulfonic esters of phenol such as Mesamoll®, rapeseed oil methyl esters, or a combination thereof, preference in that case being given to the use of a combination of diisononyl 1,2-cyclohexanedicarboxylate and rapeseed oil methyl ester.

The total amount of plasticizer in the sealant, where used, may vary within wide ranges, but for example is 10 to 80 wt %, preferably 20 to 60 wt %, based on the overall sealant, and in one preferred embodiment at least 1 wt % and suitably not more than 20 wt %, based on the overall sealant, are plasticizers based on renewable raw materials.

The sealant may optionally comprise at least one filler, this being generally preferred. The filler influences not only the rheological properties of the uncured composition but also the mechanical properties and the surface quality of the cured composition.

Examples of suitable fillers are inorganic and organic fillers, examples being natural, ground or precipitated calcium carbonates, with or without a coating of fatty acids, especially stearic acid, barium sulfate (BaSO4, also called barite or heavy spar), calcined kaolins, aluminum oxides, aluminum hydroxides, silicas, especially finely divided silicas from pyrolysis operations, carbon blacks, especially industrial carbon black, PVC powders or hollow beads. Preferred fillers are calcium carbonates, calcined kaolins, carbon black, finely divided silicas, and also flame-retardant fillers, such as hydroxides or hydrates, more particularly hydroxides or hydrates of aluminum, preferably aluminum hydroxide. It is entirely possible and may even be an advantage to use a mixture of different fillers. The sealant preferably comprises precipitated coated calcium carbonate as filler, and in one specific embodiment only precipitated coated calcium carbonate, and no other filler, is present in the sealant.

The total amount of fillers in the sealant, where used, may vary within wide ranges, but is for example 80 to 10 wt %, preferably 60 to 20 wt %, based on the overall sealant.

The sealant may optionally comprise at least one rheological modifier, such as thickeners or thixotropic agents, examples being urea compounds of the kind described as thixotropic agents ("Thixotropy endowning agent") in WO 02/48228 A2 on pages 9 to 11, polyamide waxes, bentonites or fumed silicas; organically modified castor oil and amide waxes or combinations thereof. The organically modified castor oil may be, for example, a hydrogenated castor oil or another castor oil derivative. One example of a commercially available organically modified castor oil is Thixatrol® ST.

In one specific preferred embodiment, the sealant comprises an organically modified castor oil as thixotropic agent and precipitated coated calcium carbonate as filler, with the sealant preferably comprising no fillers other than precipitated coated calcium carbonate. The precipitated coated calcium carbonate is preferably precipitated calcium carbonate coated with at least one fatty acid, especially stearic acid. One example of a commercially available precipitated coated calcium carbonate is Socal U1S2. This specific preferred embodiment of the sealant surprisingly meets the requirements of standard ASTM C719 class 50.

The organically modified castor oil here is present in the sealant preferably in an amount of 2 to 15 wt %, more preferably 5 to 10 wt %, and/or the precipitated coated calcium carbonate is present preferably in an amount of 10 to 50 wt %, more preferably 15 to 45 wt %, based on the overall sealant.

In the case of this specific preferred embodiment, the at least one silane-functional polymer P is preferably a silane-functional polyurethane polymer, more particularly at least one of the above-stated silane-functional polyurethane polymers P1 and P2.

Furthermore, the sealant of the invention may additionally comprise other constituents. Such constituents are, for example, solvents; fibers, of polyethylene, for example; dyes, pigments; adhesion promoters, examples being epoxy silanes (meth)acrylosilanes, anhydridosilanes or adducts of the aforesaid silanes with primary aminosilanes, and also aminosilanes or urea silanes; crosslinkers, examples being silane-functional oligomers and polymers; drying agents, as for example vinyltrimethoxysilane, L-functional silanes such as N-(silylmethyl)-O-methyl carbamates, more particularly N-(methyldimethoxysilylmethyl)-O-methyl carbamate, (methacryloxymethyl)-silanes, methoxymethylsilanes, N-phenyl-, N-cyclohexyl-, and N-alkylsilanes, orthoformic esters, calcium oxide or molecular sieves; stabilizers, to counter heat, light, and UV radiation, for example; flame retardants, surface-active substances such as wetting agents, flow control agents, deaerating agents or defoamers; biocides such as algicides, fungicides or fungal growth inhibitors; and also other substances customarily used in moisture-curing compositions.

It is preferred for the sealant of the invention to comprise at least one adhesion promoter, more particularly an aminosilane as also described above for the preparation of the silane-functional polymer P. The proportion of the adhesion promoter in this case is preferably 0.01 to 3 wt %, based on the overall sealant.

The sealant of the invention may further comprise a wetting agent and/or dispersant. Moreover, it is possible if desired to use what are called reactive diluents, which are incorporated into the polymer matrix when the sealant cures, in particular through reaction with the silane groups.

In one particularly preferred embodiment the sealant comprises
  a) 20 to 30 wt % of at least one silane-functional polymer P, more particularly of a γ-silane-terminated polymer, the silane-functional polymer P preferably eliminating no methanol on curing,
  b) 0.01 to 2 wt % of at least one catalyst for the crosslinking of the silane-functional polymer P, more particularly a compound which has at least one amidino group, more particularly a bicyclic amidine, and/or an organotitanate, preferably a combination of a compound which has at least one amidino group, more particularly a bicyclic amidine, and an organotitanate,
  c1) 0 to 50 wt %, more particularly 1 to 20 wt %, preferably 5 to 15 wt %, of at least one plasticizer based on a renewable raw material, as for example a vegetable oil and/or an ester of a vegetable oil, more particularly rapeseed oil methyl ester,
  c2) 0 to 50 wt % of at least one plasticizer not based on renewable raw materials, more particularly a mineral oil, an alkylsulfonic ester of phenol, a fatty acid alkyl ester or a combination thereof, preferably diisononyl 1,2-cyclohexanedicarboxylate, and
  d) 10 to 60 wt % of at least one filler,
the sealant preferably being a sealant which releases no methanol on curing.

The sealant in the cured state further preferably meets at least one of the following conditions:
  a) an elongation at break, determined to DIN 53504, of more than 300%,
  b) a Shore A hardness, determined to DIN 53505, of 10 to 40,
  c) a skin-over time of 20 to 360 min.

The measurement methods for the values reported are elucidated in detail in the working examples.

The sealant of the invention is especially suitable as construction sealant, more particularly as exterior facing sealant. In particular it is suitable as construction sealant of class 25LM according to ISO 11600. The sealant in one embodiment is suitable as a sealant according to ASTM C719 class 50.

In one particularly preferred embodiment the sealant is a) free from phthalate compounds, b) free from tin, c) eliminates no methanol on curing, and d) comprises renewable raw materials and/or compounds based on renewable raw materials, such as the plasticizers based on renewable raw materials that are described above as plasticizers.

The sealant is preferably produced and stored in the absence of moisture. Typically the sealant is stable on storage, meaning that it can be kept in the absence of moisture in a suitable pack or system, such as a drum, a pouch or a cartridge, for example, over a period ranging from several months up to a year or more, without undergoing any change in its applications properties or in its properties after curing, to an extent relevant to its service. The stability on storage is determined customarily via measurement of the viscosity or of the extrusion force.

On application of the sealant of the invention, the silane groups present in the sealant come into contact with moisture. One feature of the silane groups is that they undergo hydrolysis on contact with moisture. In this reaction, organosilanols are formed and, through subsequent condensation reactions, organosiloxanes. As the outcome of these reactions, which may be accelerated through the use of catalysts or accelerators, the sealant ultimately cures. This process is also referred to as crosslinking.

Either the water needed for curing may come from the air (atmospheric moisture), or else the sealant may be brought into contact with a water-containing component, this contact being brought about, for example, by spreading, using a smoothing means, for example, or by spraying, or else the sealant may be admixed with a water-containing component at application, in the form of a water-containing paste, for example.

The sealant of the invention is suitable for example for application to concrete, mortar, brick, tile, plaster, natural stone such as granite or marble, glass, glass-ceramic, metal or metal alloy, wood, plastic, and paint; application to construction materials is especially preferred.

The sealant of the invention is applied preferably in a temperature range from 5 to 45° C. and also cures under these conditions.

The invention further relates to the cured sealant which is obtainable from the sealant of the invention after curing thereof with water, more particularly in the form of atmospheric moisture.

The articles sealed with the sealant of the invention preferably comprise a construction, more particularly exterior facings.

EXAMPLES

Set out below are working examples which are intended to elucidate the invention described in more detail. The invention is of course not confined to these working examples described. Unless otherwise stated, quantities and percentages are by weight.

Test Methods

The secant modulus is determined at 100% elongation and 23° C. in accordance with DIN EN ISO 8339.

The elastic recovery is determined at 100% elongation in accordance with ISO 7389 (DIN concrete slabs, storage for curing: 28 days at 23° C., 50% relative humidity). For this purpose, two concrete slabs are arranged with the aid of two Teflon spacers on a polyethylene sheet to give a space in between (12×12×50 mm), into which the sealant under test is filled. The sealant is cured under the conditions stated above. The sample is subsequently subjected to elongation by 100% using a tensile strength testing machine according to DIN 51221, part 2, class 1 (elongation distance from 12 to 24 mm), and metal spacers with a width of 24 mm are inserted. The sample is taken from the testing machine and held in the elongated position for 24 hours. The spacers are then removed and the sample is placed on a glass plate treated with talcum powder. After 1 hour, the distance is measured and is used to calculate the elastic recovery in accordance with the formula in ISO 7389.

The tensile strength, the elongation at break, and the modulus of elasticity at 0-100% elongation were determined according to DIN 53504 (tensile speed: 200 mm/min) on films with a layer thickness of 2 mm, cured for 14 days at 23° C. and 50% relative humidity.

The tear resistance was determined according to DIN 53515, on films with a layer thickness of 2 mm, cured for 7 days at 23° C. and 50% relative humidity.

The skin-over time (time until freedom from tack, "tack-free time") was determined at 23° C. and 50% relative humidity. For the determination of the skin-over time, a small part of the adhesive at room temperature was applied in a layer thickness of about 2 mm to paper board, and a record was made of the time which elapsed until for the first time, when the surface of the adhesive was gently touched with an LDPE pipette, there were no longer any residues left on the pipette.

For the determination of the extrusion force, the compositions were introduced into internally coated aluminum cartridges (outer diameter 46.9 mm, inner diameter 46.2 mm, length 215 mm, aperture 15-M) and given an airtight seal with a polyethylene stopper (diameter 46.1 mm) from Novelis Deutschland GmbH. After conditioning at 23° C. for 24 hours, the cartridges were opened and the contents extruded using an extrusion device. For this device, a nozzle with a 3 mm inside diameter opening was screwed onto the cartridge thread. Using an extrusion device (Zwick/Roell Z005), a determination was made of the force needed to extrude the composition at an extrusion rate of 60 mm/min. The figure reported is an average value of the forces measured after an extrusion distance of 22 mm, 24 mm, 26 mm, and 28 mm. After an extrusion distance of 30 mm, measurement was halted.

The cure rate is determined by means of through-curing in a wedge. This is done using a Teflon wedge mold (wedge length (L) 300 mm, maximum wedge depth (d) 10 mm, wedge width 10 mm). The sealant is introduced, without bubbles and in excess, starting from the lowest point of the wedge up to the end of the wedge. The protruding sealant is pressed into the holes still present at the edges of the mold, using a wooden spatula, and the remainder is taken off with the spatula. The wedge is stored at 23° C. and 50% relative humidity, and the through-curing is determined after 1, 2, 3, 4, and 7 days. For this purpose, starting from the thin end of the now cured wedge, the sealant is pulled out of the mold until uncured sealant is found on the Teflon mold. The length of the sealant which has already cured is ascertained in mm (l). The sealant is subsequently replaced in the mold and gently pressed down. The through-curing is determined by the following formula (all figures in mm): $D=(l \cdot d)/L$, where D is through-curing, l is length of sealant already cured, L is wedge length, and d is maximum wedge depth.

The Shore A hardness was determined according to DIN 53505 on samples with a layer thickness of 6 mm, cured for 14 days at 23° C. and 50% relative humidity.

For example 4 and the commercial product Sonolastic, testing took place to determine whether they meet the requirements of ASTM C719 class 50.

Production of the Silane-Functional Polyurethane Polymer with Ethoxy end Groups P-EtO Under a nitrogen atmosphere, 700 g of Acclaim® 12200 polyol (Bayer MaterialScience AG, Germany; low monol polyoxypropylene diol; OH number 11.0 mg KOH/g; water content about 0.02 wt %), 32.1 g of isophorone diisocyanate (Vestanat® IPDI, Evonik Degussa GmbH, Germany), 85.4 g of 2,2,4-trimethyl-1,3-pentanediol diisobutyrate (Eastman TXIB™; Eastman Chemical Company, USA), and 0.1 g of bismuth tris(neodecanoate) (10 wt % in Hexamoll® DINCH, BASF SE, Germany) were heated to 90° C. with continual stirring and left at this temperature. After a reaction time of an hour, titration found a free isocyanate group content of 0.7 wt %. Then 0.14 mol (corresponding to a stochiometric reaction of the NCO groups with silane) of reactive silane (Int-EtO) was added, and stirring was continued at 90° C. for 2 to 3 hours more. The reaction was discontinued as soon as free isocyanate was no longer detectable by IR spectroscopy (2275-2230 cm$^{-1}$). The product was cooled to room temperature (23° C.) and stored in the absence of moisture (theoretical polymer content=90%).

The reactive silane Int-EtO (diethyl N-(3-triethoxysilyl-propyl)aminosuccinate) was prepared as follows: 100 g of 3-aminopropyltriethoxysilane (Dynasylan® AMEO from Evonik Degussa GmbH, Germany) were introduced. Added slowly with thorough stirring at room temperature were 77.8 g of diethyl maleate (Fluka Chemie GmbH, Switzerland) and the mixture was stirred at 60° C. for 12 hours.

Production of the Silane-Functional Polyurethane Polymer with Methoxy End Groups P-MeO The silane-functional polyurethane polymer with methoxy end groups P-MeO was produced in the same way as the silane-functional polyurethane polymer with ethoxy end groups P-EtO, except that instead of the reactive silane Int-EtO the reactive silane Int-MeO (diethyl N-(3-trimethoxysilylpropyl)aminosuccinate) was used. The reactive silane Int-MeO was prepared in the same way as the reactive silane Int-EtO, but using 3-aminopropyltrimethoxysilane rather than 3-aminopropyltriethoxysilane.

Production of the Thixotropic Agent TM

A vacuum mixer was charged with 1000 g of diisononyl 1,2-cyclohexanedicarboxylate (DINCH, Hexamoll® DINCH) and 160 g of 4,4'-diphenylmethane diisocyanate (Desmodur®44 MC L, Bayer MaterialScience AG, Germany) and this initial charge was slightly warmed. Then 90 g of monobutylamine were added dropwise slowly with vigorous stirring. The white paste formed was stirred further for an hour under reduced pressure and with cooling. The thixotropic agent TM contains 20 wt % of thixotropic agent in 80 wt % of DINCH.

Production of the Sealants

In a vacuum mixer, in accordance with the parts by weight indicated in table 1, the silane-functional polymer (P-MeO or P-EtO), plasticizers (Hexamoll DINCH and/or rapeseed oil methyl ester), thixotropic agents (TM or Thixatrol ST) and vinyltrimethoxy- and/or -triethoxysilane (Dynasylan® VTMO and/or VTEO from Evonik Degussa GmbH, Germany) were mixed thoroughly for 5 minutes. Subsequently the fillers (Socal® U1S2, Solvay SA, Belgium and Omyacarb® 5-GU, Omya AG, Switzerland) were incorporated with kneading at 60° C. for 15 minutes. With the heating switched off, the remaining constituents (catalysts, silanes) were subsequently added and were processed to a homogeneous paste under reduced pressure for 10 minutes. This paste was then dispensed into internally coated aluminum gun-application cartridges.

TABLE 1

Composition of the sealants in parts by weight

|  | Ex.1 | Ex.2 | Ex.3 | Ex.4 |
|---|---|---|---|---|
| P-MeO | 25 | 25 |  | 25 |
| P-EtO |  |  | 27 |  |
| Thixotropic agent TM |  |  | 17 |  |
| Thixatrol ST | 8 | 8 |  | 8 |
| Dynasylan VTEO |  |  | 2 |  |
| Dynasylan VTMO | 1.4 | 1 |  | 1.0 |
| Hexamoll DINCH | 10 | 6 | 7 | 12.5 |
| Rapeseed oil methyl ester | 15 | 15 |  | 15 |
| Hydroseal G400H |  | 5 |  |  |
| Omyacarb 5 GU | 20 | 24 | 20 |  |
| Socal U1S2 | 20 | 15 | 25 | 38 |
| Tyzor IBAY |  |  | 0.5 |  |
| Tytan TAA |  | 0.57 |  |  |
| Lupragen N 700 (DBU) | 0.03 | 0.03 | 0.5 | 0.03 |
| Silquest A-1891 |  |  | 1 |  |
| Silquest A-1110 | 0.57 | 0.4 |  | 0.47 |

Testing of the Sealant Formulations

The formulations produced were tested using the test methods reported above. For comparison, the following commercial products, likewise based on silane-functional polymers, were tested in the same way:

| Sikaflex | Sikaflex ® AT-Connection from Sika |
| Danalim | Danalim ® MS Byggefuge 552 |
| Ljungdahl | Ljungdahl ® MS 20 Polymeric Modehvid |
| Sonolastic | Sonolastic ® 150 with VLM Technology from BASF |

The results are set out in table 2 below. Also included in table 2 is information on the presence of organotin catalysts and phthalate plasticizers in the respective formulations or commercial products, and also on the release of methanol on curing.

TABLE 2

|  | Secant modulus (23° C.) at 100% elongation [MPa] | Elastic recovery [%] | Organotin cat. | Phthalate plasticizer | Methanol released on curing |
|---|---|---|---|---|---|
| Sikaflex | 0.35 | 75 | yes | yes | yes |
| Danalim | 0.45 | 20 | yes | yes | yes |
| Ljungdahl | 0.47 | 35 | yes | no | yes |
| Sonolastic* | 0.25 | 32 | yes | yes | yes |
| Ex.1 | 0.17 | 70 | no | no | yes |
| Ex.2 | 0.25 | 75 | no | no | yes |
| Ex.3 | 0.32 | 72 | no | no | no |
| Ex.4* | 0.20 | 73 | no | no | yes |

*comply with ASTM C719 class 50

The properties of the sealants produced were investigated. The results are shown in table 3.

TABLE 3

|  |  | Ex. 1 | Ex. 2 | Ex. 3 | Ex. 4 |
|---|---|---|---|---|---|
| Tensile strength [MPa] | 14 d RT | 0.7 | 1.0 | 1.5 | 0.9 |
| Elongation at break [%] | 14 d RT | 500 | 770 | 420 | 600 |
| Secant modulus [MPa] | 28 d RT (100%) | 0.17 | 0.25 | 0.32 | 0.20 |
| Stress 24 h | OK/coh./adh. | OK | OK | OK | OK |
| Tear resistance [N/mm] | 7 dRT | 3.6 | 4.0 | 5.1 | 3.8 |
| Elasticity modulus 0-100% [MPa] | 14 d RT | 0.2 | 0.2 | 0.4 | 0.2 |
| Skin-over time [min] | 1 d RT | 120 | 50 | 40 | 110 |
| Extrusion force [N] | 1 d RT | 230 | 286 | 650 | 245 |
| Through-curing [mm] | 1 d RT | 2.8 | 3.6 | 2.7 | 3.0 |
|  | 2 d RT | 5.5 | 5.5 | 4.2 | 5.4 |
|  | 3 d RT | 6.8 | 6.9 | 5.1 | 6.7 |
|  | 4 d RT | 8.1 | 8.0 | 7.8 | 8.2 |
|  | 7 d RT | 9.2 | 9.8 | 8.9 | 9.3 |
| Shore A | 14 d RT | 10 | 15 | 30 | 10 |
| Elastic recovery |  | 70 | 75 | 72 | 73 |

The invention claimed is:

1. A moisture-curing sealant comprising
   a) at least one silane-functional polymer P;
   b) at least one catalyst for the crosslinking of the silane-functional polymer P, and
   c) at least 10 wt % of at least one plasticizer based on renewable raw materials,
   wherein the sealant is free from organotin compounds and in the cured state has a secant modulus at 100% elongation and 23° C., determined to DIN EN ISO 8339, of less than 0.4 MPa and an elastic recovery at 100% elongation, determined to DIN EN ISO 7389, of ≥70%.

2. The sealant as claimed in claim 1, wherein the sealant is free from phthalate-containing compounds.

3. The sealant as claimed in claim 1, wherein the silane-functional polymer P does not eliminate methanol on curing.

4. The sealant as claimed in claim 1, wherein the sealant has an extrusion force at 23° C. of less than 800 N.

5. The sealant as claimed in claim 1, wherein the sealant a) is free from phthalate compounds, b) is free from tin, c) eliminates no methanol on curing, and d) comprises renewable raw materials.

6. The sealant as claimed in claim 1, wherein the sealant is a construction sealant of class 25LM according to ISO 11600.

7. The sealant as claimed in claim 1, wherein the sealant further comprises:
   c) the at least one plasticizer comprising diisononyl 1,2-cyclohexanedicarboxylate, an alkylsulfonic ester of phenol, rapeseed oil methyl ester, and mixtures thereof, and/or
   d) at least one filler, the at least one filler being present in the sealant in an amount of 10 wt % to 80 wt %.

8. The sealant as claimed in claim 1, wherein the plasticizer is a rapeseed oil methyl ester.

9. The sealant as claimed in claim 1, wherein the catalyst for the crosslinking of the silane-functional polymer P comprises a compound which has at least one amidino group.

10. The sealant as claimed in claim 1, wherein the silane-functional polymer P is a γ-silane-terminated polymer.

11. The sealant as claimed in claim 1, wherein the sealant comprises:

a) 20 wt % to 30 wt % of at least one silane-functional polymer P, optionally of a γ-silane-terminated polymer, the silane-functional polymer P optionally being a silane-functional polymer P which eliminates no methanol on curing,
b) 0.01 wt % to 2 wt % of at least one catalyst for the crosslinking of the silane-functional polymer P, optionally a compound which has at least one amidino group, or a bicyclic amidine, and/or organotitanate, optionally a combination of a compound which has at least one amidino group, optionally a bicyclic amidine, and an organotitanate,
c1) at least 10% of at least one plasticizer based on a renewable raw material,
c2) 0 wt % to 50 wt % of at least one other plasticizer not based on renewable raw materials, optionally a mineral oil, an alkylsulfonic ester of phenol or a fatty acid alkyl ester or a combination thereof, and
d) 10 to 60 wt % of at least one filler, and
wherein the sealant does not release methanol on curing.

12. The sealant as claimed in claim 1, wherein the sealant in the cured state meets at least one of the following conditions:
a) an elongation at break, determined to DIN 53504, of more than 300%,
b) a Shore A hardness, determined to DIN 53505, of 10 to 40,
c) a skin-over time of 20 min to 360 min.

13. The sealant as claimed in claim 1, wherein the silane-functional polymer P is selected from:
a silane-functional polyurethane polymer P1, obtained by the reaction of a silane having at least one group that is reactive toward isocyanate groups with a polyurethane polymer comprising isocyanate groups,
a silane-functional polyurethane polymer P2, obtained by the reaction of an isocyanatosilane with a polymer which has functional end groups that are reactive toward isocyanate groups, or
a silane-functional polymer P3, obtained by a hydrosilylation reaction of polymers having terminal double bonds.

14. The sealant as claimed in claim 1, wherein the sealant comprises an organically modified castor oil as thixotropic agent and precipitated coated calcium carbonate as filler.

15. The sealant as claimed in claim 1, wherein the sealant meets the requirements according to ASTM C719 class 50 or the requirements according to ASTM C719 class 50.

16. A construction sealant obtained from the sealant as claimed in claim 1.

17. A cured sealant obtained from the sealant as claimed in claim 1 after curing thereof with water.

18. The sealant as claimed in claim 1, wherein the at least one plasticizer comprises diisononyl 1,2-cyclohexanedicarboxylate, an alkylsufonic ester of phenol, rapeseed oil methyl ester, or combination thereof.

19. The sealant as claimed in claim 1, wherein the catalyst for crosslinking of the silane-functional polymer P comprises a bicyclic amidine, a guanidine, a organotitanate, or a combination thereof.

20. The sealant as claimed in claim 1, wherein the catalyst for crosslinking of the silane-functional polymer P comprises a bicyclic amidine, a guanidine, and a organotitanate.

* * * * *